(12) United States Patent
Chennagowni et al.

(10) Patent No.: US 11,725,606 B2
(45) Date of Patent: Aug. 15, 2023

(54) OIL DRAIN BACK SEAL AND SYSTEMS, ASSEMBLIES, KITS, AND METHODS THEREOF

(71) Applicant: Caterpillar Inc., Peoria, IL (US)

(72) Inventors: Suresh B. Chennagowni, Peoria, IL (US); Mandar A. Joshi, Dunlap, IL (US); Benjamin D. Stoltzfus, Dunlap, IL (US); Pradeep Chapagain, Dunlap, IL (US); Gregory O. Potts, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 17/316,720

(22) Filed: May 11, 2021

(65) Prior Publication Data
US 2022/0364525 A1  Nov. 17, 2022

(51) Int. Cl.
*F02F 11/00* (2006.01)
*F01M 11/02* (2006.01)

(52) U.S. Cl.
CPC ......... *F02F 11/002* (2013.01); *F01M 11/02* (2013.01)

(58) Field of Classification Search
CPC .............................. F02F 11/002; F01M 11/02
See application file for complete search history.

(56) References Cited

U.S. PATENT DOCUMENTS

| | | | |
|---|---|---|---|
| 1,077,677 A * | 11/1913 | Curtiss | B65D 47/265 222/542 |
| 1,928,585 A | 9/1933 | Balfe | |
| 2,395,243 A * | 2/1946 | Aukers | F16J 15/123 277/600 |
| 2,681,241 A * | 6/1954 | Aukers | F16J 15/123 277/596 |
| 3,448,986 A * | 6/1969 | Dial | F16J 15/123 92/169.1 |
| 4,049,856 A | 9/1977 | Adams | |
| 4,535,999 A | 8/1985 | Locacius | |
| 5,631,049 A | 5/1997 | Boldt | |
| 5,649,713 A | 7/1997 | Ledgerwood | |
| 5,897,119 A | 4/1999 | McMillen | |
| 8,136,819 B2 * | 3/2012 | Yoshitsune | F16J 15/061 277/630 |
| 2006/0185763 A1 * | 8/2006 | Rosenbaum | F01M 11/0408 141/338 |
| 2007/0102887 A1 * | 5/2007 | Sandford | F16J 15/0825 277/598 |

(Continued)

FOREIGN PATENT DOCUMENTS

EP  0 662 428 A1  7/1995

OTHER PUBLICATIONS

Written Opinion and International Search Report for Int'l. Patent Appln. No PCT/US2022/027575, dated Aug. 19, 2022 (13 pgs).

*Primary Examiner* — Kurt Philip Liethen
(74) *Attorney, Agent, or Firm* — XSensus, LLP

(57) ABSTRACT

A funnel or drain back seal and systems, assemblies, components, kits, and methods thereof can comprise a body defining an opening that extends from a top of the body to a bottom of the body; a head portion that extends outward from the top of the body; and a flap or lip that extends outward from the bottom of the body. The opening can be adapted to pass draining oil from the top of the body to the bottom of the body for supply into an engine block.

10 Claims, 6 Drawing Sheets

(56) References Cited

U.S. PATENT DOCUMENTS

| | | | |
|---|---|---|---|
| 2007/0240667 A1* | 10/2007 | Sudoh | F02M 35/10039 |
| | | | 123/184.55 |
| 2009/0193972 A1* | 8/2009 | Schwandt | C09B 69/00 |
| | | | 96/174 |
| 2011/0308664 A1* | 12/2011 | Gregal | B63H 21/383 |
| | | | 137/15.04 |
| 2016/0169391 A1 | 6/2016 | Emig et al. | |
| 2016/0177870 A1 | 6/2016 | Sabotta | |

* cited by examiner

… (US 11,725,606 B2)

OIL DRAIN BACK SEAL AND SYSTEMS, ASSEMBLIES, KITS, AND METHODS THEREOF

TECHNICAL FIELD

The present disclosure relates to a seal for a cylinder block of an internal combustion engine, and more particularly to a drain back seal, and systems, assemblies, kits, and methods thereof.

BACKGROUND

Two main parts of any engine are its cylinder head and engine block. The block contains the pistons and cylinders while the cylinder head contains the rocker arms and valves. A cylinder head gasket, spacer plate, and shim gasket may be provided between the engine block and the cylinder head. The cylinder shim gasket can serve as a seal for coolant and oil for all the of the cylinders inside the engine block. Still, the cylinder head gasket and the shim gasket may not be sufficient. For example, sealing techniques can include diverting oil from the cylinder head back into the engine block. However, with increased crankcase pressure such sealing techniques can allow blow-by oil to leak through a shim gasket joint. This can result in external oil leaks from the cylinder head to the block joint.

U.S. Patent Pub. No. 2016/0169391 ("the '391 patent publication") describes a gasket configured as a single block that includes a guide ring made of tough material, at least one dynamically loaded sealing lip, and at least one statically loaded sealing lip. The '391 patent publication also describes that the dynamically loaded sealing lip and the statically loaded sealing lip are formed of a rubber elastic material and are connected with the guide ring. According to the '391 patent publication, a first dynamically loaded sealing lip is configured for sealing a medium from a space to be sealed and a second dynamically loaded sealing lip is configured for sealing out contaminants from the surrounding environment.

SUMMARY

According to aspects of the disclosed subject matter, a funnel or drain back seal is disclosed or provided. The funnel or drain back seal can comprise a body defining an opening that extends from a top of the body to a bottom of the body; a head portion extending outward from the top of the body; and a lip extending outward from the bottom of the body. The opening can be adapted to pass draining oil from the top of the body to the bottom of the body for supply into an engine block.

According to other aspects of the disclosed subject matter, an engine kit is disclosed or provided. The engine kit can comprise a plurality of funnel seals configured to be respectively provided in drain back holes of an engine block, each of the funnel seals including a body defining a longitudinal opening from a top of the body to a bottom of the body, a head portion extending outward from the top of the body, and a lip extending outward from the bottom of the body; and a head gasket configured to be disposed on the engine block and interface with the funnel seals.

And according to yet other aspects of the disclosed subject matter, an internal combustion engine is disclosed or provided. The internal combustion engine can comprise an engine block, the engine block including a drain back hole; a funnel seal including a body defining a longitudinal opening from a top of the body to a bottom of the body, a head portion extending radially outward from the top of the body, and a blow-back lip extending radially outward from the bottom of the body, wherein the funnel seal is disposed in the drain back hole; a cylinder head; a head gasket positioned between the engine block and the cylinder head, the head gasket having an opening through which the funnel seal is provided into the drain back hole such that the head portion of the funnel seal sits in the opening of the head gasket and has at least a portion that is flush with the head gasket with the head gasket; a shim gasket positioned between the engine block and the head gasket; and a spacer plate positioned between the head gasket and the shim gasket. The funnel seal can be configured to divert oil draining from the cylinder head back into the engine block. The blow-back lip can be configured to shield against blow-by material moving in a direction opposite a direction in which the oil drains from the cylinder head into the engine block due to crank case pressure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The present disclosure relates to a seal for a cylinder block of an internal combustion engine, and systems, assemblies, kits, and methods thereof. More particularly, embodiments of the present disclose pertain to a drain back or funnel seal for a cylinder block of an internal combustion engine, and systems, assemblies, components, kits, and methods thereof.

Figure 1A:
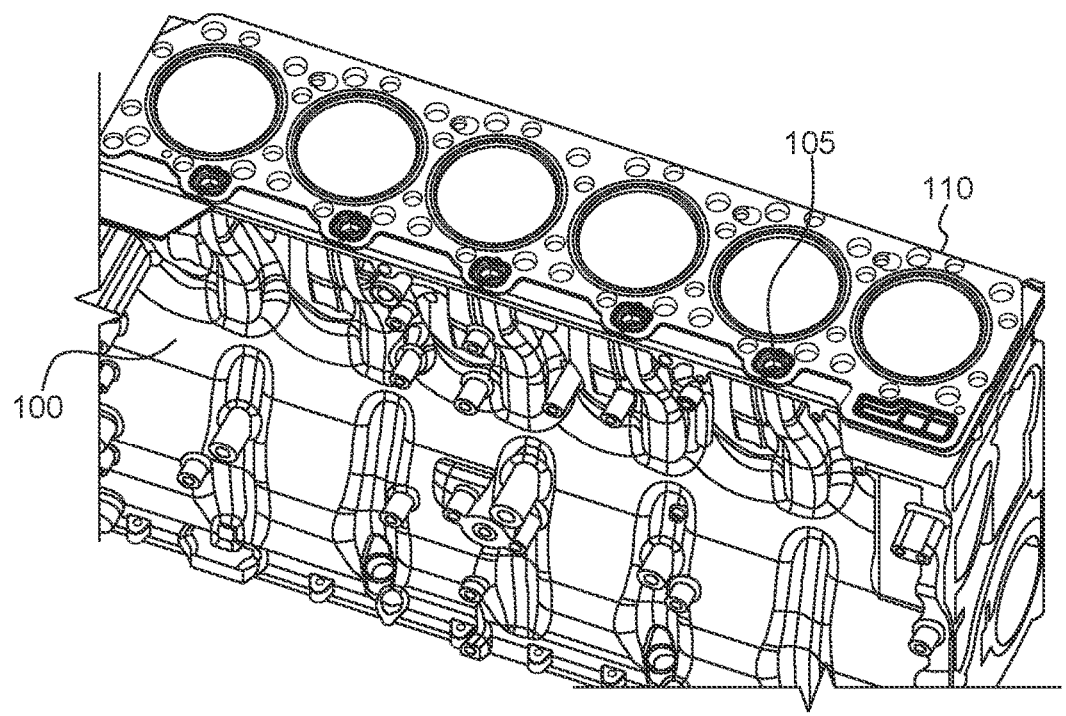
FIG. 1A illustrates a perspective view of an engine block according to one or more aspects of the disclosed subject matter.
Figure 1B:
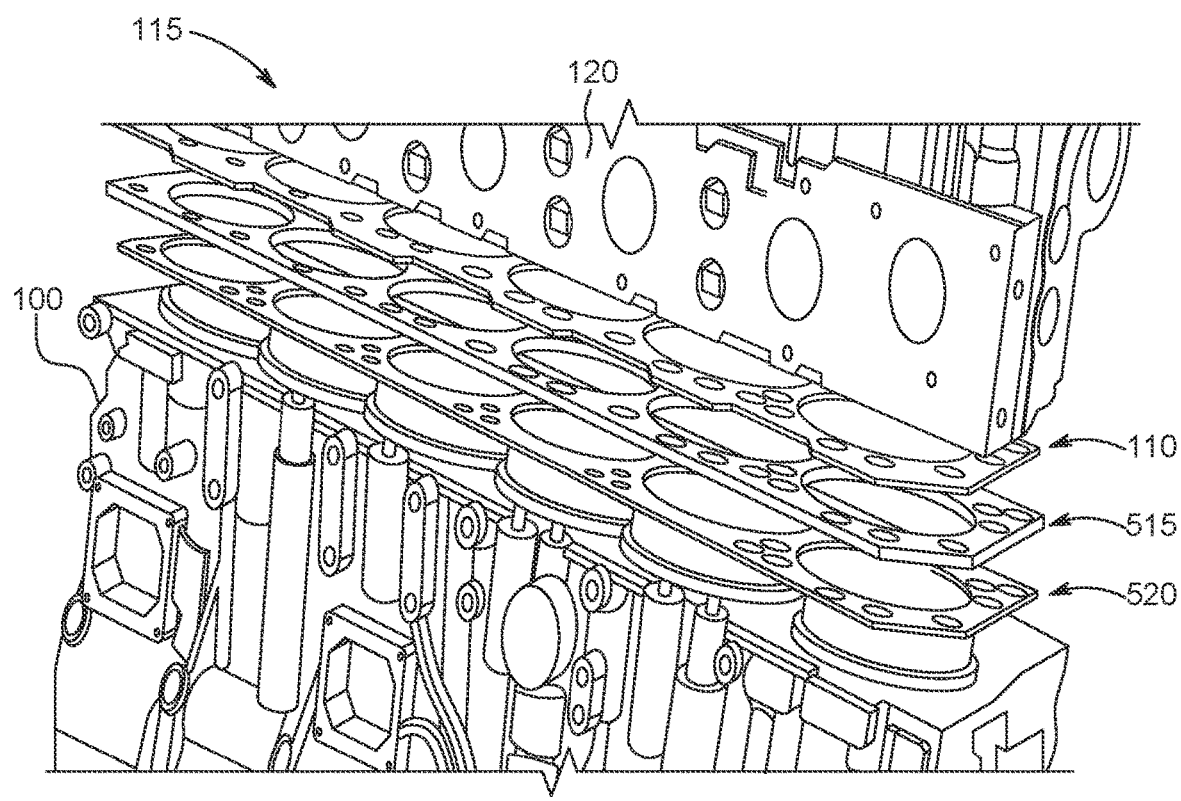
FIG. 1B illustrates an exploded view of an engine including the engine block in FIG. 1A according to one or more aspects of the disclosed subject matter.

Referring to FIG. 1A and FIG. 1B, FIG. 1A illustrates a perspective view of an engine block 100 according to one or more aspects of the disclosed subject matter, whereas FIG.

1B illustrates an engine 125 having the engine block 100. Another name for engine block is cylinder block.

The engine block 100 can include one or more drain back holes 105. Generally, the drain back hole 105 can be operative as a portion of the engine block 100 where oil can drain from a cylinder head 120 over the engine block 100 back to the engine block 100.

FIG. 1A and FIG. 1B also illustrate a head gasket 110 positioned on the engine block 100, between the engine block 100 and the cylinder head 120. In one aspect, a shim gasket 520 can be positioned between the engine block 100 and a spacer plate 515. The spacer plate 515 can be positioned between the shim gasket 520 and the head gasket 110. The head gasket 110 can be positioned between the spacer plate 515 and the cylinder head 120.

Figure 2:
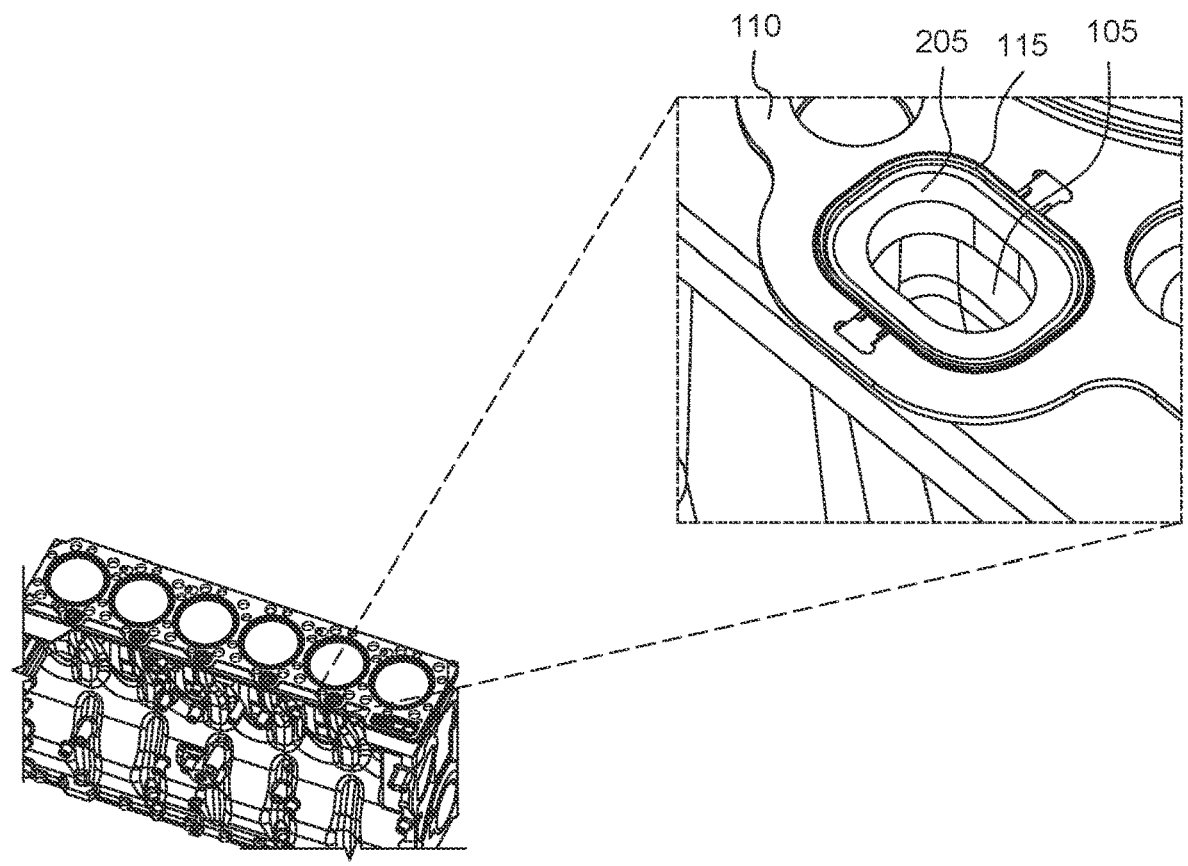
FIG. 2 illustrates an enlarged view of a portion of the engine block of FIG. 1A.

FIG. 2 illustrates an enlarged view of a portion of the engine block 100 of FIG. 1A and FIG. 1B. As shown in FIG. 2, according to one or more embodiments, the head gasket 110 may include or define a cut out or opening 115 over the drain back hole 105. Optionally, the cut out 115 can create a space 205 within which a portion of a seal 300 (discussed in more detail with respect to FIG. 3) can be received. The seal 300 may be referred to herein as a funnel seal 300 or a drain back seal 300. Thus, the cut out 115 of the head gasket 110 can define an open area greater than an open area at an inlet of the drain back hole 105, such as shown in FIG. 2. Also shown in FIG. 2, according to one or more embodiments, the cut out 115 and the inlet of the drain back hole 105 may be elongate, for instance, in the form of a rectangular oval and an oval, respectively.

Figure 3:
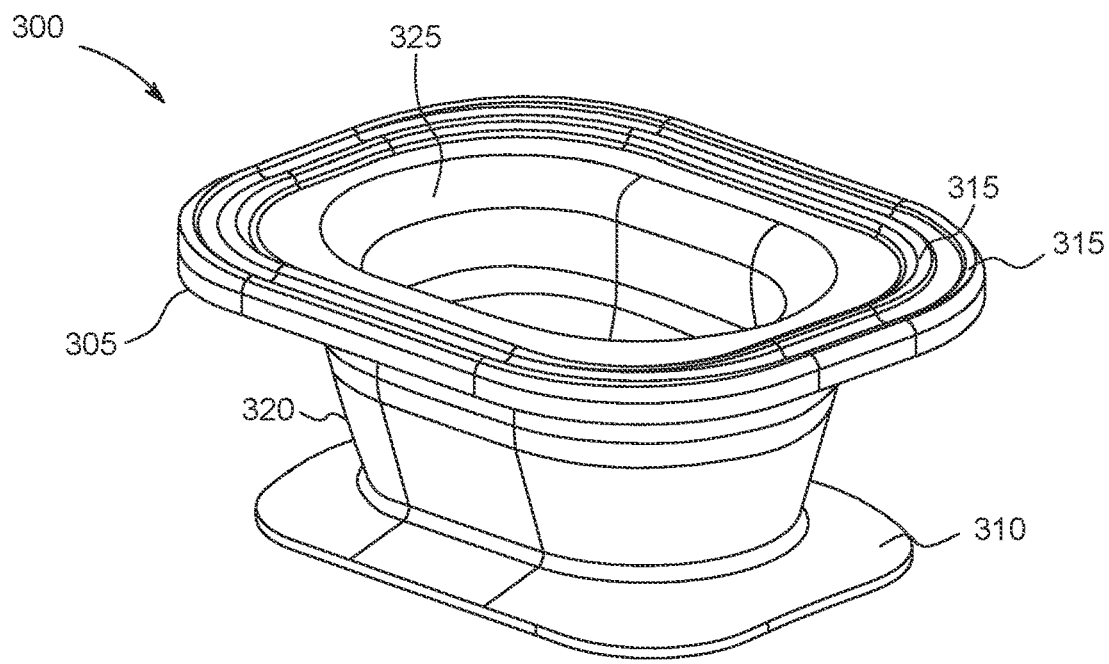
FIG. 3 illustrates a perspective view of a seal according to one or more aspects of the disclosed subject matter.

FIG. 3 illustrates a perspective view of the seal 300 according to one or more aspects of the disclosed subject matter. The seal 300 can include a head portion 305, a lip or flap 310, and a body 320 positioned between the head portion 305 and the lip 310. The seal 300 can be formed in one piece and/or made of rubber (e.g., an oil-resistant rubber). According to one or more embodiments, the seal 300 can be elongate in top and bottom plan views. For instance, the head portion 305 and/or the lip 310 can be in the form of a rectangular oval in the top and bottom plan views, respectively.

The seal 300, particularly the body 320 thereof, can define an opening 325 that extends through the seal 300, from a top of the body 320 to a bottom of the body 320. In that the opening 325 can extend entirely through the seal 300, the opening 325 may be referred to as a longitudinal opening of the seal 300. The opening 325 can be adapted to pass draining oil from the cylinder head 120 into the engine block 100. In one aspect, the body 320 can be tapered inward to create a funnel shape (for the draining oil). Thus, the opening 325 can taper from widest at the top of the body 320 to narrowest at the bottom of the body 320. Put another way, a first area of the opening 325 at the top of the body 320 can be greater than a second area of the opening 325 at the bottom of the body 320. Optionally, even though the opening 325 may taper a thickness of the body 320 may be the same thickness from the top of the body 320 to the bottom of the body 320 (see, e.g., FIG. 5). According to one or more embodiments, as an example, the opening 325 can be in the form of an oval in the top plan view and/or the bottom plan view of the seal 300.

The lip 310 can extend outward from the body 320, particularly from a bottom portion of the body 320. For instance, the lip 310 can extend from the very bottom of the body 320 radially outward and optionally downward at an angle relative to horizontal (see, e.g., FIG. 5). The lip 310 can be continuous and circumscribe the bottom of the body 320. According to one or more embodiments, top and bottom surfaces of the lip 310 can be flat and smooth without any surface features.

The head portion 305 can extend outward from the body 320, particularly from the top or upper portion of the body 320. For instance, the head portion 305 can extend from the top of the body 320 radially outward and optionally perpendicular to the top portion of the body 320 (see, e.g., FIG. 5). The head portion 305 can be continuous and circumscribe the top of the body 320.

According to one or more embodiments, a top surface of the head portion 305 can include one or more ridges 315. That is, one or more ridges 315 may extend from the upper surface of the head portion 305. The one or more ridges 315 can take the shape of the head portion 305 (e.g., rectangular oval in the top plan view). Hence, the one or more ridges 315 can be in the form of continuous rings, for instance, concentric continuous rings in the top plan view of the seal 300. Optionally, one of the ridges 315 can be at the edge of the head portion 305 and define an outer perimeter of the head portion 305, such as shown in FIG. 3. In the case of multiple ridges 315 the ridges 315 can extend from the upper surface of the head portion 305 by a same amount (e.g., same heights), or the ridges 315 may extend from the upper surface of the head portion 305 by different amounts (e.g., different heights). According to one or more embodiments, the ridge 315 at the edge or perimeter of the head portion 305 can extend from the upper surface of the head portion 305 more than any of other one or more ridges 315. Troughs may be provided between adjacent ridges 315 and/or a landing may be provided between the top of the body 320 and one of the ridges 315 closest to the top of the body 320.

The ridges 315 can be configured to interface (e.g., directly contact) with the cylinder head 120. For instance, the ridges 315 can interface with the cylinder head 120 according to a predetermined amount of contact pressure for each of the ridges 315. Optionally, the contact pressure may be the same for each of the ridges 315. The one or more ridges 315 can interface with the cylinder head 120 such that oil draining from the cylinder head 120 into the engine block 100 is completely shielded from joint crevices in the direction of the drain.

As noted above, the lip 310 and the head portion 305 can extend outward from the bottom and top of the body 320, respectively. According to one or more embodiments, the head portion 305 may extend outward more than the lip 310 extends outward. Such extending can be relative to the top and bottom of the body 320, respectively, and optionally relative to a center longitudinal axis that runs in a direction of the opening 325. That is, due to the optional tapering of the body 320 from the top to the bottom, according to one or more embodiments the head portion 305 may extend outward from the body 320 more than the lip 310, even if the two are of the same length, for instance.

Figure 4:
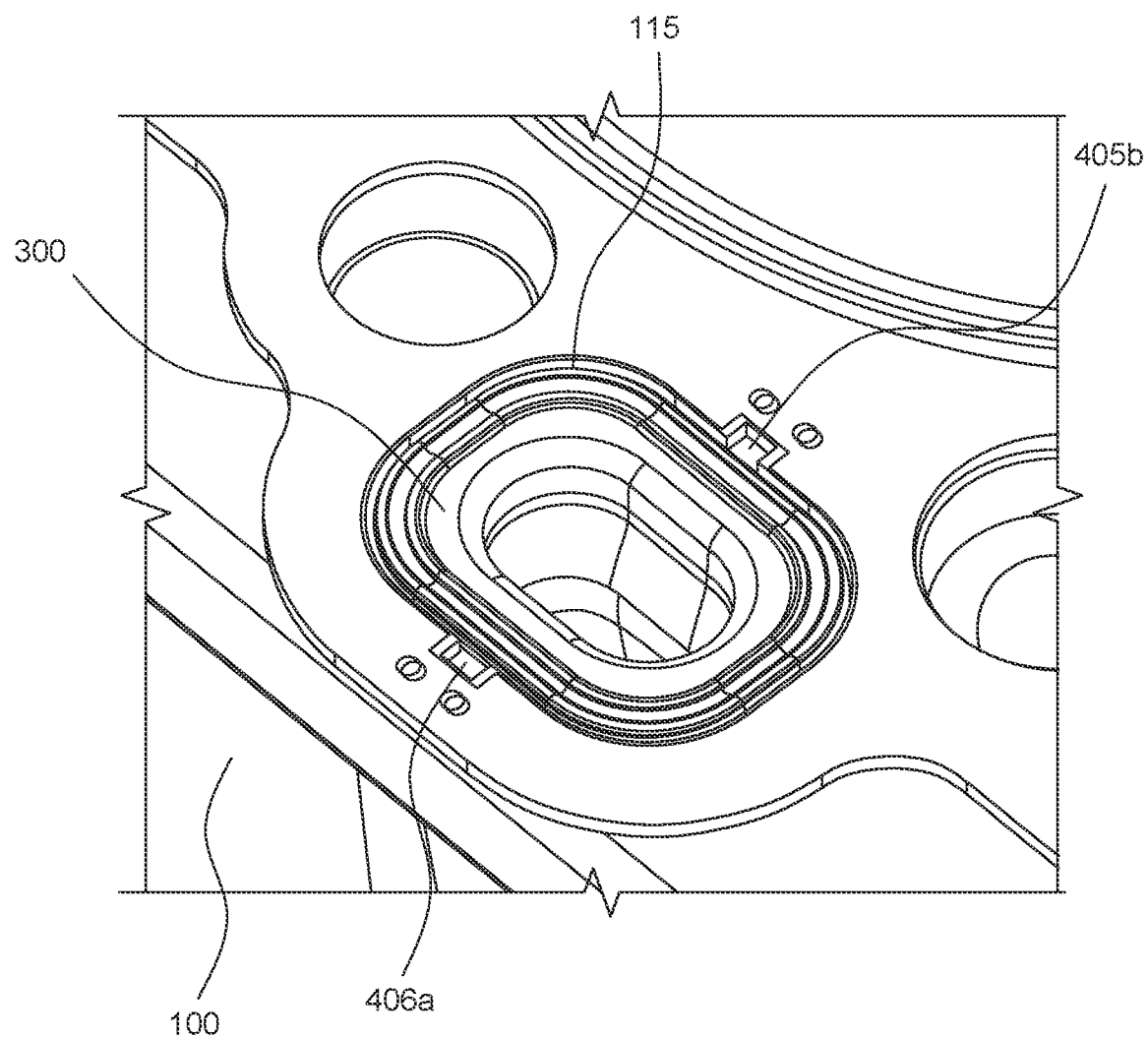
FIG. 4 illustrates a perspective view of the seal of FIG. 3 in a drain back hole in the engine block of FIG. 1A according to one or more aspects of the disclosed subject matter.

Turning to FIG. 4, FIG. 4 illustrates a perspective view of the seal 300 provided in the drain back hole 105 in the engine block 100 according to one or more aspects of the disclosed subject matter. Notably, the head portion 305 of the seal 300 can sit in the space 205 created by the cut out 115 of the head gasket 110 such that the head gasket 110 interfaces with, or at least is adjacent to, the funnel seal 300, while at least a portion of the body 320 and the lip 310 can be positioned in the drain back hole 105 (according to one or more embodiments, a portion of the body 320 may be in the optional spacer plate 515 in a case where the spacer plate 515 forms part of the drain back hole 105).

Optionally, one or more notches, such as first and second notches 405a and 405b, can be cut out of the head gasket 110. The notches 405a and 405b can remain open after the seal 300 is positioned in the drain back hole 105. Additionally, the notches 405a and 405b can be positioned diametrically opposite from each other. In one aspect, the notches 405a and 405b may provide easy user access to the seal 300, for instance, to remove the seal 300 from the cut out 115 of the head gasket 110.

INDUSTRIAL APPLICABILITY

As noted above, the present disclosure relates to a drain back seal for a cylinder block of an internal combustion engine, and more particularly to a drain back seal filling a gap between a lower portion of the drain back seal and the cylinder block and systems, assemblies, components, kits, and methods thereof.

Though a head gasket 110 can serve as a seal for all cylinders inside an engine block, such as engine block 100; however, providing the head gasket 110 alone may not be sufficient. For example, techniques can include diverting oil from the cylinder head 120 of the engine 125 back into the engine block 100. With increased crankcase pressure, such techniques can allow blow-by product (e.g., oil and/or gas) to leak through corresponding shim gasket joint(s). This can result in external oil leaks from the cylinder head 120 to block joint. More specifically, even if the oil can be diverted from the cylinder head 120 of the engine 125 back into the engine block 100, such techniques may not prevent blow-by product moving in an opposite direction of the draining from escaping and leaking through the shim gasket joint.

Figure 5:
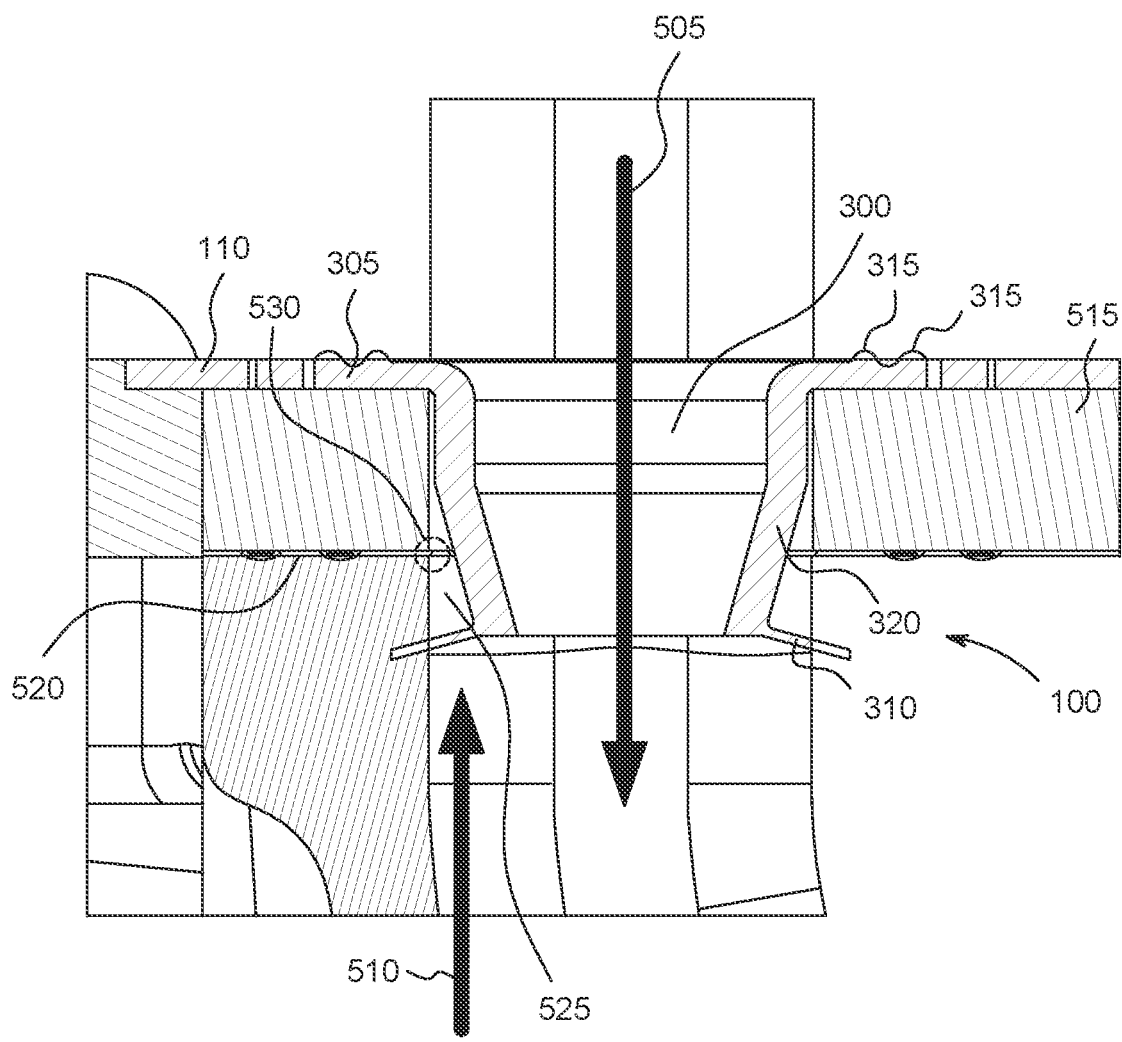
FIG. 5 illustrates a sectional view of the seal in the drain back hole in the engine block of FIG. 4.

FIG. 5 illustrates a sectional view of the seal 300 as part of an assembly according to one or more embodiments of the disclosed subject matter.

As noted above, the seal 300 can include the head portion 305, the lip or flap 310, and the body 320 positioned between the head portion 305 and the lip 310, where the body 320 can define the opening 325 that extends through the seal 300, from the top of the body 320 to the bottom of the body 320.

Notably, FIG. 5 shows the seal 300 being provided in the drain back hole 105 in the engine block 100 of FIG. 4. In operation, oil can be allowed to drain from the cylinder head 120 of the engine 125 to the engine block 100 in a direction illustrated by arrow 505. However, the seal 300 can divert oil from the cylinder head 120 back into the engine block 100 while completely shielding any joint crevices in the direction of the drain (i.e., arrow 505).

As noted above, the top surface of the head portion 305 of the seal 300 can include one or more ridges 315. That is, one or more ridges 315 may extend from the upper surface of the head portion 305. The one or more ridges 315 can be in the form of continuous rings, for instance, concentric continuous rings in the top plan view of the seal 300.

Figure 6:
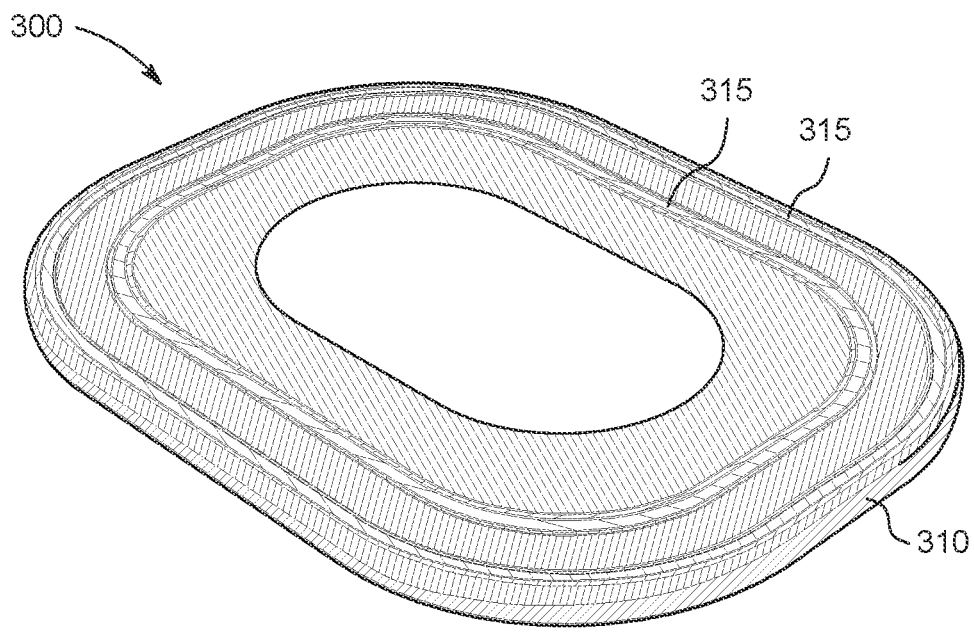
FIG. 6 illustrates exemplary contact pressures on various portions of a seal according to one or more aspects of the disclosed subject matter.
Figure 6:
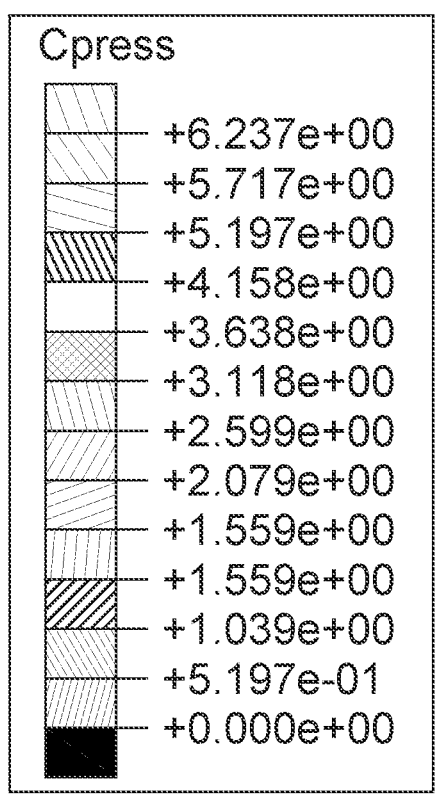

At least some of the upper surface of the head portion 305 may be flush with the upper surface of the head gasket 110. Optionally, the tops or peaks of one or more of the ridges 315 may extend to a height above the upper surface of the head gasket 110. The ridge(s) 315 can be configured to interface (e.g., directly contact) with the cylinder head 120. For instance, the ridges 315 can interface with the cylinder head 120 according to a predetermined amount of contact pressure for each of the ridges 315, such as shown in FIG. 6 (FIG. 6 shows only a portion of the head portion 305). Notably, the tops or peaks of the ridges 315 can have a greatest amount of contact pressure with the cylinder head 120, whereas surrounding portions may have minimal or even no contact with the cylinder head 120. For instance, FIG. 6 shows that the contact pressure decreases moving away from the peak of the ridges 315.

The interface between the head portion 305 and the cylinder head 120 can be such that oil draining from the cylinder head 120 into the engine block 100 is prevented from escaping, for instance, via joint crevices in the direction of the drain (i.e., direction of arrow 505).

Additionally, blow-by material or product (e.g., oil and/or gas) can move in a direction illustrated by arrow 510 in FIG. 5, which is an opposite direction of the oil draining from the cylinder head 120 of the engine 125 to the engine block 100. The lip 310 of the seal 300, however, can shield one or more gaps or areas between the seal 300 and the wall(s) of the drain back hole 105 from the blow-by material or product that may be caused due to crank case pressure. For instance, the lip 310 can prevent or minimize blow-by product from going outside (i.e., radially outside of) the seal 300 and into an area or location 525 and/or an area or location 530, which may be referred to or characterized as leaking through the shim gasket joint.

Figure 7:
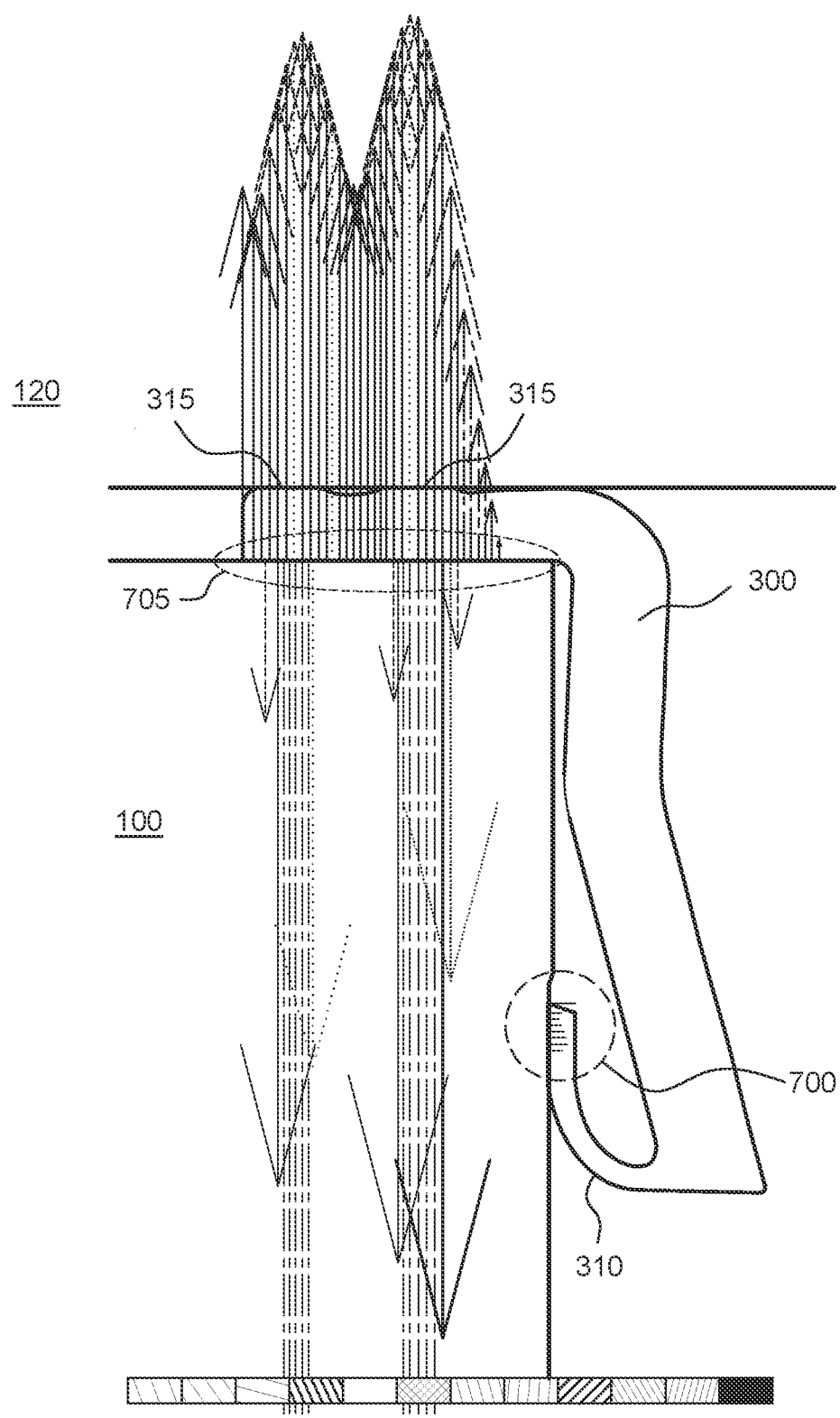
FIG. 7 illustrates various contact interfaces configured to prevent blow-by leaks according to one or more aspects of the disclosed subject matter.

FIG. 7 illustrates various contact interfaces configured to prevent blow-by leaks according to aspects of the disclosed subject matter. For example, the size of the arrows can correspond to a magnitude of contact, i.e., contact force, at the particular contact interface. In one aspect, the lip 310 of the seal 300 can create a contact interface with the engine block 100 in the drain back hole 105. The contact interface between the engine block 100 and the lip 310 in the drain back hole 105 can correspond to area 700. Notably, according to one or more embodiments, the lip 310 of the seal 300 can be bent upward from horizontal, for instance, from an angle below horizontal in a relaxed state prior to being provided in the drain back hole 105. The contact interfaces created by the seal 300 in area 700 can prevent blow-by oil from leaking out of the engine 125. For example, in one aspect, the contact interface created by the seal 300 in area 700 can prevent blow-by oil from leaking out of area 530 and from leaking through the shim gasket 520 shown in FIG. 5. The seal 300 can also create a contact interface with the engine block 100 corresponding to area 705.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An engine kit comprising:
   a plurality of funnel seals configured to be respectively provided in drain back holes of an engine block, each of the funnel seals including:
      a body defining a longitudinal opening from a top of the body to a bottom of the body, a head portion extending outward from the top of the body, and a lip extending outward from the bottom of the body; and a head gasket configured to be disposed on the engine block and interface with the funnel seals such that an entirety of the lip is at a level below the head gasket for each of the funnel seals when the funnel seals are provided in the drain back holes, wherein the longitudinal opening of the funnel seal tapers from widest at the top of the body to narrowest at the bottom of the body, wherein an outer diameter of the body decreases between the top of the body to the bottom of the body from where the lip extends outward, wherein for each of the funnel seals a first area of the longitudinal opening at the top of the body is greater than a second area of the longitudinal opening at the bottom of the body, and wherein the lip extends from the bottom of the body outward and downward at an angle relative to horizontal.

2. The engine kit of claim 1, wherein the head gasket has a plurality of openings configured to be respectively provided around the drain back holes when provided on the engine block and respectively interface with corresponding ones of the funnel seals when the funnel seals are respectively provided in the drain back holes, and wherein for each of the funnel seals the head portion is adapted to sit in a corresponding one of the openings of the head gasket.

3. The engine kit of claim 1, wherein for each of the funnel seals an upper surface of the head portion includes one or more continuous ridges, each of the ridges being configured to interface with a cylinder head according to a predetermined amount of contact pressure when the cylinder head is provided on the engine block, and wherein the head portion of each of the funnel seals is configured to divert oil draining into the engine block.

4. The engine kit of claim 1, wherein for each of the funnel seals:

the lip is adapted to shield a corresponding gap between the body of the funnel seal and the engine block from blow-by product due to the crank case pressure, and/or the lip is adapted to shield a shim gasket joint from the blow-by product due to the crank case pressure, and wherein the blow-by material includes at least one of gas and oil.

5. The engine kit of claim 1, wherein for each of the funnel seals:

the head portion and the lip are in the form of a rectangular oval in top and bottom plan views of the funnel seal, respectively, and the longitudinal opening is in the form of an oval in each of the top and bottom plan views, and the head portion extends radially outward more than the lip extends radially outward.

6. A drain back seal comprising:

a body defining an opening that extends from a top of the body to a bottom of the body;

a head portion extending outward from the top of the body; and a flexible flap extending outward from the bottom of the body, wherein the opening is adapted to pass draining oil from the top of the body to the bottom of the body for supply into an engine block, wherein a minimum thickness of the head portion is greater than a maximum thickness of the flexible flap, wherein the opening tapers from widest at the top of the body to narrowest at the bottom of the body, wherein an outer diameter of the body decreases between the top of the body to the bottom of the body from where the flexible flap extends outward from the bottom of the body, and wherein the flexible flap extends from the bottom of the body outward and downward at an angle relative to horizontal.

7. The drain back seal of claim 6, wherein a plurality of concentric continuous ridges extend from an upper surface of the head portion.

8. The drain back seal of claim 6, wherein the head portion and the flap circumscribe the top of the body and the bottom of the body, respectively, and wherein the head portion extends outward more than the flap extends outward.

9. The drain back seal of claim 6, wherein the drain back seal is elongate in top and bottom plan views, each of the head portion and the flap being in the form of a rectangular oval in the top and bottom plan views, respectively, and the opening is in the form of an oval in each of the top and bottom plan views.

10. The drain back seal of claim 6, wherein top and bottom surfaces of the flap are flat and smooth without any surface features.

* * * * *